(12) United States Patent  
Fukumoto et al.

(10) Patent No.: US 7,701,942 B2  
(45) Date of Patent: Apr. 20, 2010

(54) NETWORK MONITOR SYSTEM, DATA AMOUNT COUNTING METHOD AND PROGRAM FOR USE IN THE SYSTEM

(75) Inventors: Keisuke Fukumoto, Tokyo (JP); Bun Mizuhara, Tokyo (JP)

(73) Assignee: NEC Corporation, Tokyo (JP)

( * ) Notice: Subject to any disclaimer, the term of this patent is extended or adjusted under 35 U.S.C. 154(b) by 2441 days.

(21) Appl. No.: 10/170,354

(22) Filed: Jun. 14, 2002

(65) Prior Publication Data

US 2003/0012139 A1   Jan. 16, 2003

(30) Foreign Application Priority Data

Jun. 14, 2001   (JP) .............................. 2001-179432

(51) Int. Cl.  
 *H04L 12/28* (2006.01)
(52) U.S. Cl. ...................... 370/392; 370/389; 370/412; 711/108
(58) Field of Classification Search ................. 370/389, 370/392, 412  
See application file for complete search history.

(56) References Cited

U.S. PATENT DOCUMENTS 5,185,736 A * 2/1993 Tyrrell et al. ................ 370/358
5,235,595 A   8/1993 O'Dowd
6,122,279 A   9/2000 Milway et al.
6,449,255 B1 * 9/2002 Waclawsky ................. 370/236
6,973,034 B1 * 12/2005 Natarajan et al. ........... 370/232
6,975,617 B2 * 12/2005 Walker et al. ............... 370/349

FOREIGN PATENT DOCUMENTS

| CN | 1038006 A | 12/1989 |
|---|---|---|
| JP | H10-224373 A | 8/1998 |
| JP | H10-308742 A | 11/1998 |
| JP | 11-191766 A | 7/1999 |
| JP | 2000-209200 A | 7/2000 |
| JP | 2001-257722 A | 9/2001 |
| WO | WO 97/03549 | 2/1997 |
| WO | WO 00/60793 A | 10/2000 |

* cited by examiner

*Primary Examiner*—Duc Ho  
(74) *Attorney, Agent, or Firm*—Sughrue Mion, PLLC

(57) ABSTRACT

In a network monitor system having a plurality of line cards, each of the line cards monitors a communication data amount in consideration of a group or a finer group with conditions other than an IP address added thereto. Each of the line cards controls the communication data amount by the use of a line interface section 11, a header extraction section 12, a flow identification section 13, and a counter section 16.

21 Claims, 16 Drawing Sheets

|  | FLOW #1 | FLOW #K | FLOW #N |
|---:|:---:|:---:|:---:|
| ToS | a | h | a |
| IDENTIFICATION | b | i | p |
| PROTOCOL | c | j | q |
| SOURCE ADDRESS | d | k | r |
| DESTINATION ADDRESS | e | l | s |
| SOURCE PORT | f | m | t |
| DESTINATION PORT | g | n | u |
| COUNT NUMBER | #0 | #1 | #0 |

FIG. 9

NETWORK MONITOR SYSTEM, DATA AMOUNT COUNTING METHOD AND PROGRAM FOR USE IN THE SYSTEM

BACKGROUND OF THE INVENTION

1. Field of the Invention

The present invention relates to a network monitor system, and a data amount counting method and a program for use in the system, and, in particular, to a method of monitoring data flowing on a network.

2. Description of the Related Art

As a conventional method of monitoring data flowing on a network, a method has heretofore been adopted which at first sets a path such that the data passes through a network monitor apparatus and accumulates an amount of passed data by a network monitor apparatus. In this case, the network monitor apparatus calculates and generates accounting information in response to the data amount.

However, in this method, the data has to be sure to pass through the network monitor apparatus. Otherwise, the accounting information cannot be generated and, as a result, no accounting information can be generated with respect to the data which does not pass through the network monitor apparatus. In addition, the generation of the accounting information is limited by a processing capability of the network monitor apparatus.

To solve the problem, a technique described in Japanese Patent Application Laid-Open Hei 11-191766, namely, 1999-191766 comprises: counting an amount of communication data based on a source Internet protocol (IP) address during data reception; and counting the amount of communication data based on a destination IP address during data transmission.

Specifically, the above-described conventional method of monitoring the data flowing on the network monitors the communication data amount based on the source and destination IP addresses during the data transmission/reception. Therefore, it is impossible to monitor the communication data amount in consideration of a group or a sub-divided group defined by any other conditions than the IP address.

SUMMARY OF THE INVENTION

An object of the present invention is to solve the above-described problem, and to provide a network monitor system, and a data amount count method and a program for use in the system, all of which can effectively monitor a communication data amount in consideration of a group or a subdivided group defined by any other conditions than an IP address.

According to one aspect of the present invention, there is provided a network monitor system comprising: a plurality of line cards each of which determines an outgoing path from a header of a packet; and a switch which switches to an outside line card in accordance with information of the outgoing path, wherein each of the plurality of line cards includes counter means for using an identifier given beforehand to each predetermined control unit including any one of a flow which is identified from the information of the header and indicates a flow of data, and a flow group predetermined based on the information of the header to control a communication amount of the packets.

According to another aspect of the present invention, there is provided a data amount count method of a network monitor system comprising: a plurality of line cards each of which determines an outgoing path from a header of a packet; and a switch which switches to an outside line card in accordance with information of the outgoing path, wherein each of the plurality of line cards includes a step of using an identifier given beforehand to each predetermined control unit including any one of a flow which is identified from the information of the header and indicates a flow of data, and a flow group predetermined based on the information of the header to control a communication amount of the packets.

According to still another aspect of the present invention, there is provided a program of a data amount count method of a network monitor system comprising: a plurality of line cards each of which determines an outgoing path from a header of a packet; and a switch which switches to an outside line card in accordance with information of the outgoing path, the program allowing the system to execute a processing of using an identifier given beforehand to each predetermined control unit including any one of a flow which is identified from the information of the header and indicates a flow of data, and a flow group predetermined based on the information of the header to control a communication amount of the packets.

That is, in the network monitor system of the present invention, the number of packets or bytes is counted every flow, and the number of packets or bytes can be counted in consideration of the flow group.

More concretely, in the network monitor system of the present invention, a flow identification section identifies the flow based on a part of an IP header or transmission control protocol (TCP) header when receiving an IP packet from a line interface section extracted by a header extraction section, and transmits an IP packet length, and a count number (No.) having one-to-one correspondence with the flow, or a count number having one-to-one correspondence with the flow group to a counter section.

Here, the flow indicates the flow of data in the network, particularly the flow of data to a data reception apparatus from a data transmission apparatus. Moreover, the flow group indicates one group of even one flow of data divided in accordance with a difference in service or protocol, flows to a plurality of data reception apparatuses from the predetermined data transmission apparatus, or flows to a plurality of data reception apparatuses from a plurality of data transmission apparatuses.

The counter section accesses a memory based on the count number from the flow identification section, reads in the number of packets or bytes received by then, adds one to the number of packets, adds a packet length to the number of bytes and writes the numbers in the memory.

Thereby, the count number can be given to each entry of a content addressable memory (CAM) for use in the above-described flow identification. Therefore, the number of packets or bytes can be controlled every flow, and the total number of packets or bytes can be counted in consideration of the group.

Moreover, when the count number is imparted to each group, the total numbers of packets and bytes of the group can be counted. Therefore, a memory area can be saved when counting the sum of a plurality of flows.

Furthermore, when the count number is changed with respect to the entry of CAM, the group can be changed. Therefore, the group to count can easily be changed.

Additionally, the count number is derived by a flow search, search by source and destination addresses (hereinafter referred to SD search), and search only by the destination address (hereinafter referred to as D search). Therefore, it is possible to form the group in consideration of fine conditions Additionally, the counting method may be implemented in a computer readable medium embodied with a computer program for executing the method.

BRIEF DESCRIPTION OF THE DRAWINGS

FIG. 9 is an explanatory view of a flow and flow group according to one embodiment of the present invention.

DESCRIPTION OF THE PREFERRED EMBODIMENT

Figure 1:
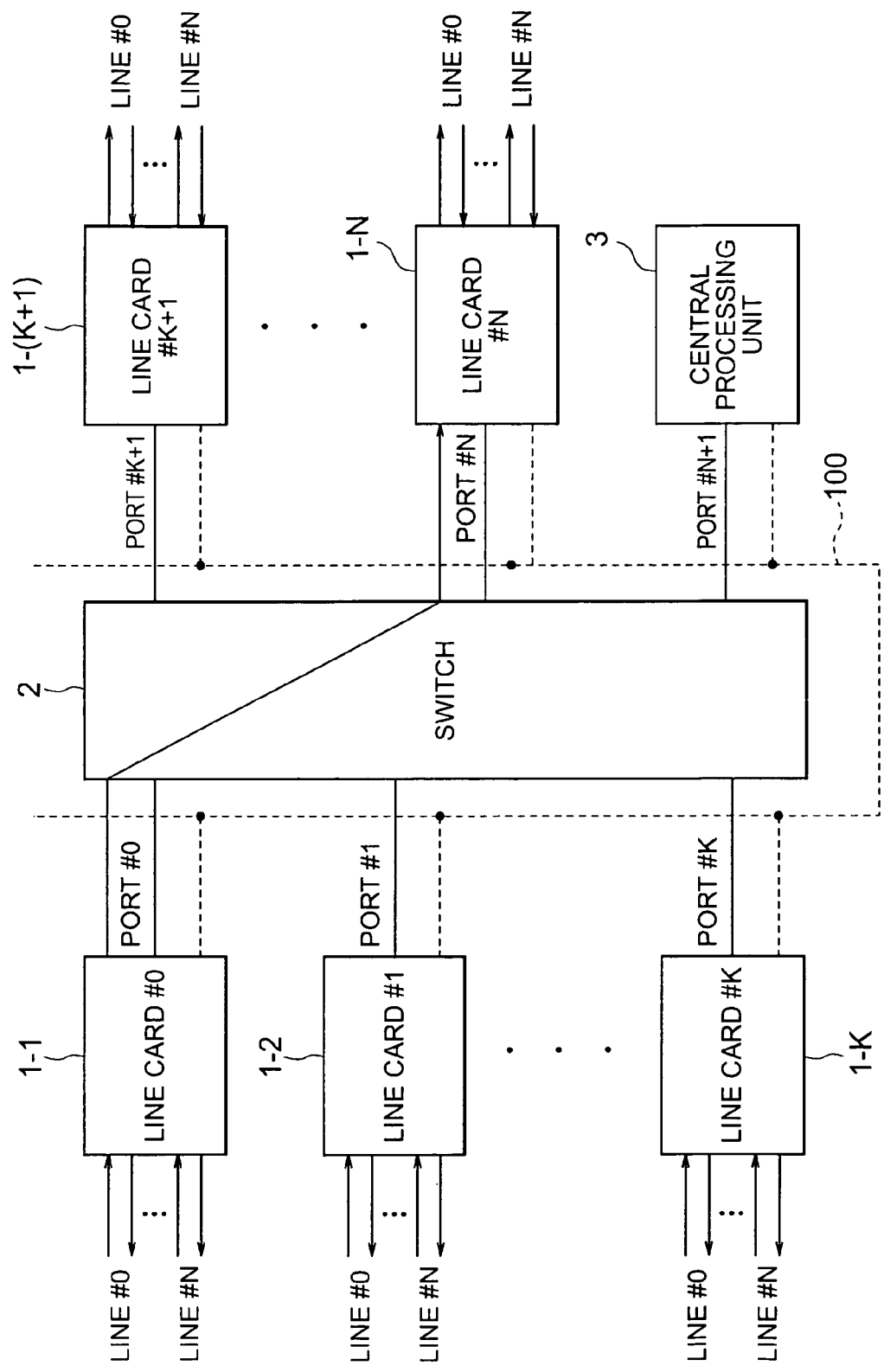
FIG. 1 is a block diagram showing a system constitution of a network monitor system according to one embodiment of the present invention.

One embodiment of the present invention will next be described with reference to the drawings. FIG. 1 is a block diagram showing a system constitution of a network monitor system according to one embodiment of the present invention. In FIG. 1, the network monitor system according to one embodiment of the present invention has a plurality of line cards 1-1 to 1-N; a switch 2; a central processing unit 3; and a maintenance bus 100. The maintenance bus 100 serves to monitor states of the line cards 1-1 to 1-N by the central processing unit 3. The central processing unit 3 generates commands through the maintenance bus 100.

Each of the line cards 1-1 to 1-N determines an outgoing path from a header of an Internet protocol (IP) packet, and outputs data with outgoing path information added thereto to the switch 2. The switch 2 is switched to transfer the IP packet from one of the outside line cards 1-1 to 1-N to another in accordance with the outgoing path information. Thus, each of the line cards 1-1 to 1-N outputs the IP packet to a network (not shown). Additionally, FIG. 1 shows that the IP packet from the line card 1-1 is outputted to the network from the outside line card 1-N through the switch 2.

Moreover, each of the line cards 1-1 to 1-N has a function of counting the number of packets or bytes of the IP packet outputted to the switch 2 by a predetermined control unit, that is, every flow or flow group. The central processing unit 3 monitors states of the line cards 1-1 to 1-N through the maintenance bus 100, sets information on the flow or the flow group to the line cards 1-1 to 1-N and outgoing path information, collects count information of each flow or each flow group, and generates accounting information using the count information.

Figure 2:
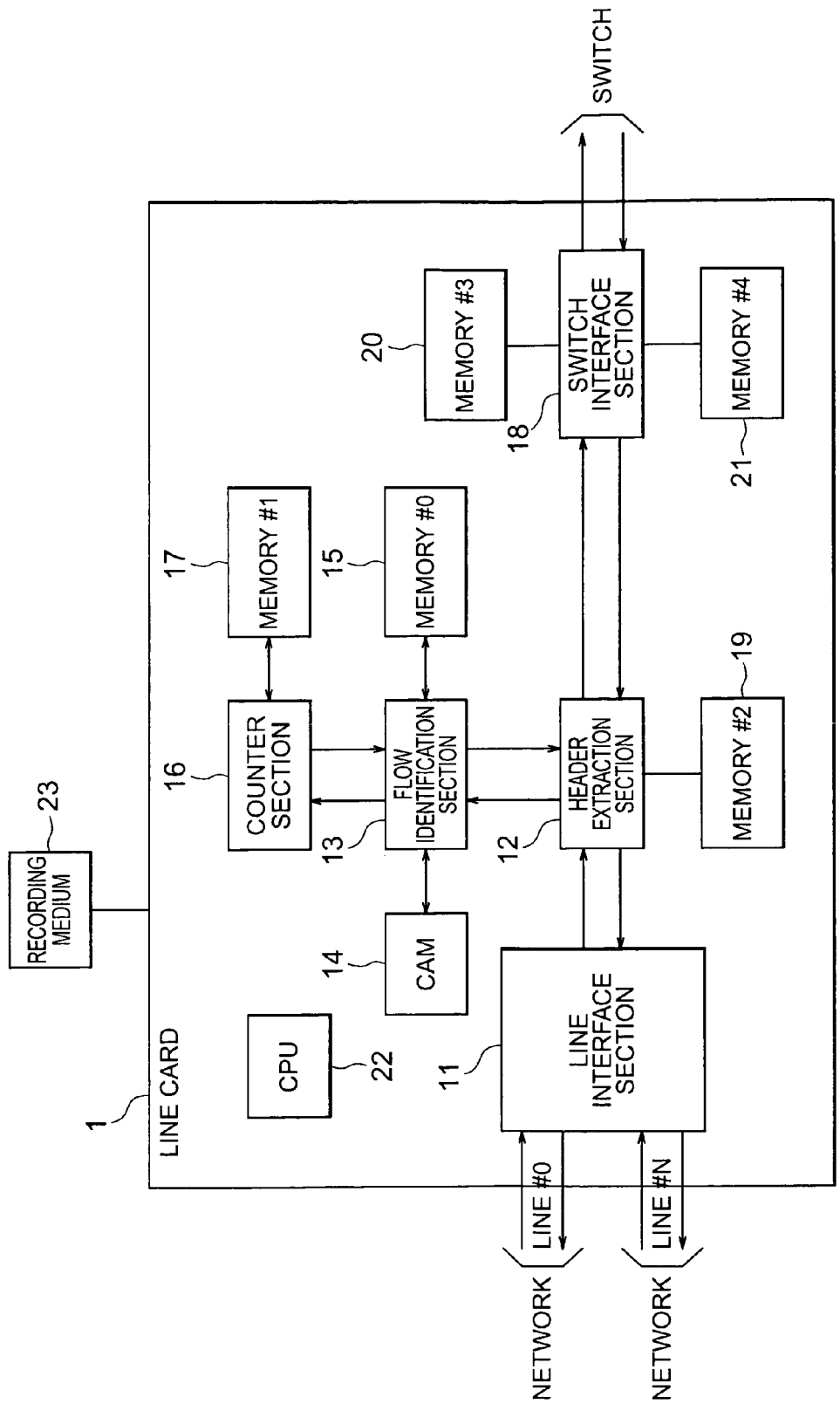
FIG. 2 is a block diagram showing a constitution example of a line card of FIG. 1.

FIG. 2 exemplifies one of the line cards 1-1 to 1-N of FIG. 1. In FIG. 2, the line cards 1-1 to 1-N are generically represented by a line card 1. The line card 1 is constituted of: a line interface section 11; a header extraction section 12; a flow identification section 13; a content-addressable memory (CAM) 14; memories (#0 to #4) 15, 17, 19 to 21; a counter section 16; a switch interface section 18; a CPU 22; and a recording medium 23 including a storage region for storing programs executed in the respective sections such as the CPU 22 in the apparatus and a work region for use in the CPU 22.

The line interface section 11 is connected to the header extraction section 12, and transmits the IP packet received from the network (not shown) to the header extraction section 12. The header extraction section 12 has the memory (#2) 19, and accumulates IP packets in the memory 19, until the outgoing path information is received from the flow identification section 13. Moreover, the header extraction section 12 judges that the IP packet has been received from the line interface section 11. Then, the header extraction section extracts a part of an IP header or transmission control protocol (TCP) header, and transmits the information to the flow identification section 13.

The flow identification section 13 is connected to the content-addressable memory (CAM) 14 and memory (#0) 15. The flow identification section 13 refers to the CAM 14 by the use of a search key based on the information from the flow identification section 13 to access the memory (#0) 15 based on the address obtained from the CAM 14, and solves the outgoing path information to be transferred to the header extraction section 12 or solves the count number (No.) to be transferred to the subsequent-stage counter section 16. Additionally, in the memory (#0) 15, the outgoing path information and count number are stored at each address searched from the CAM 14.

The counter section 16 has the memory (#1) 17, and controls a packet counter of each flow or each flow group upon receiving the packet length and count number from the flow identification section 13.

The switch interface section 18 is connected to the header extraction section 12, memory (#3) 20 and memory (#4) 21. The switch interface section 19 has a function of accumulating the IP packet received from the header extraction section 12 in the memory 20, forming the packet into cells and outputting each cell to the switch 2. In addition, the switch interface section 18 further has a function of accumulating the cell received from the switch 2 in the memory 21, forming the cells into the IP packet and outputting the packet to the header extraction section 12.

The CPU 22 is connected to each block in the line card 1 via the maintenance bus (not shown in FIG. 2), and sets or maintains each block in the line card 1. Additionally, the recording medium 23 has the storage region for storing the program executed in each block in the line card 1 including the CPU 22, and the work region for use in executing the program by the CPU 22.

Figure 3:
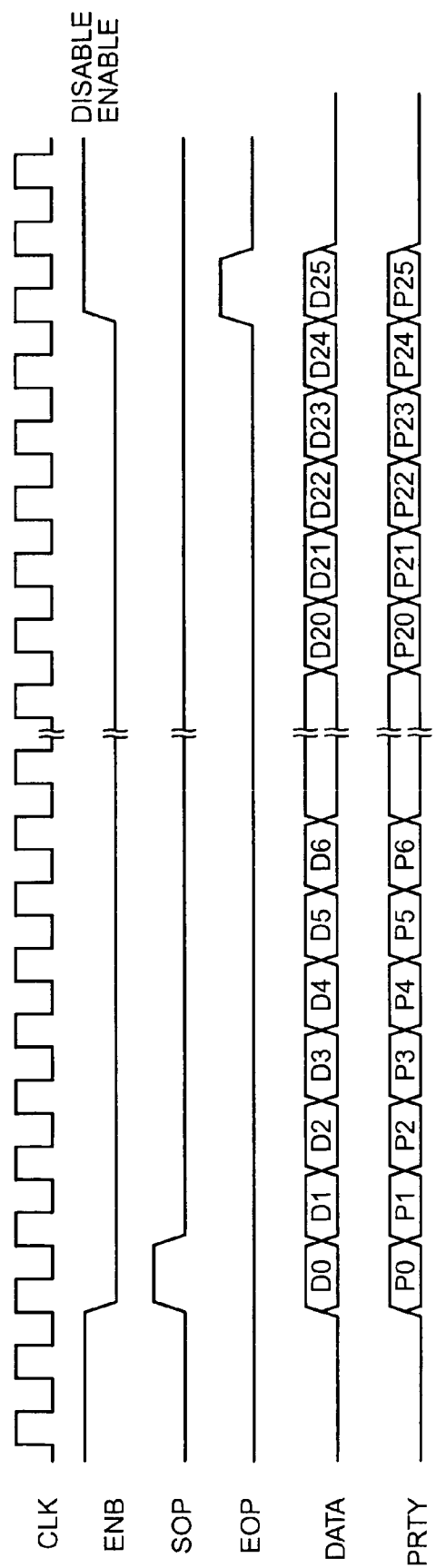
FIG. 3 is a time chart showing an operation of the network monitor system according to one embodiment of the present invention.

FIG. 3 is a time chart showing an operation of the network monitor system according to one embodiment of the present invention. In FIG. 3, a clock (CLK), start of the packet (SOP), end of the packet (EOP), data (DATA), and parity (PRTY) are given through the line interface section 11 to the header extraction section 12. The SOP serves to indicate the start of the packet while the EOP serves to indicate the end of the packet. In FIG. 3, enable (ENB) is a signal showing a period from generation of SOP to generation of EOP. In the illustrated example, the ENB takes a low level or an enable state on the generation of the SOP and a high level or a disable state on the generation of the EOP.

Upon receiving the SOP, the header extraction section 12 judges that the start of the packet has been received, extracts a part of the IP header of the IP packet received from the line interface section 11 and the TCP header, and transfers the extracted information to the flow identification section 13. Moreover, the header extraction section 12 recognizes the end of the IP packet by the EOP, and judges the data received from when SOP is enabled until EOP is enabled as one IP packet.

Figure 4:
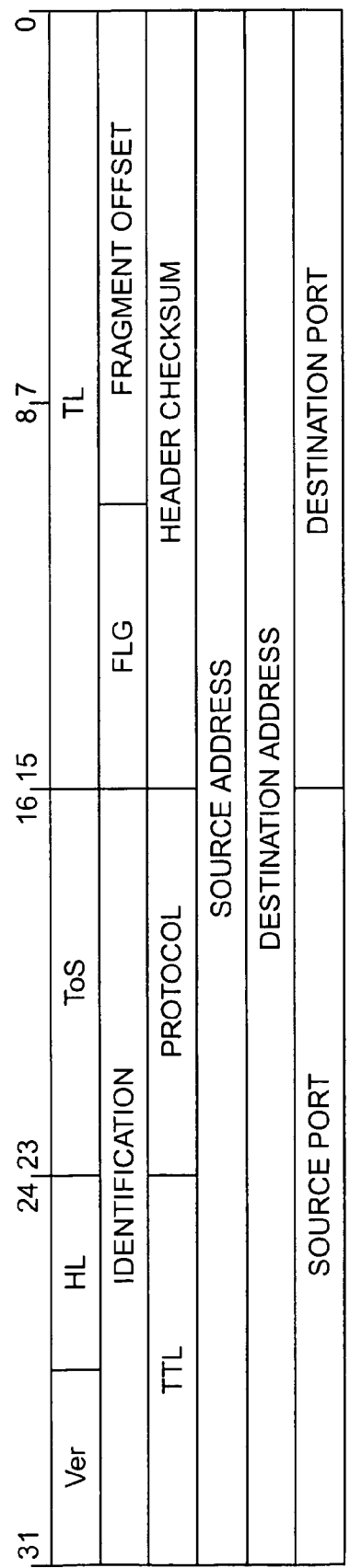
FIG. 4 is a diagram showing header information extracted by a packet extraction section of FIG. 2.

FIG. 4 is a diagram showing header information extracted by the packet extraction section 12 of FIG. 2. In FIG. 4, the header information is constituted of Ver, header length (HL), type of service (ToS), total length (TL), Identification, Flg, Fragment Offset, time to live (TTL), Protocol, Header Checksum, Source Address, Destination Address, Source Port, and Destination Port.

Figure 5:
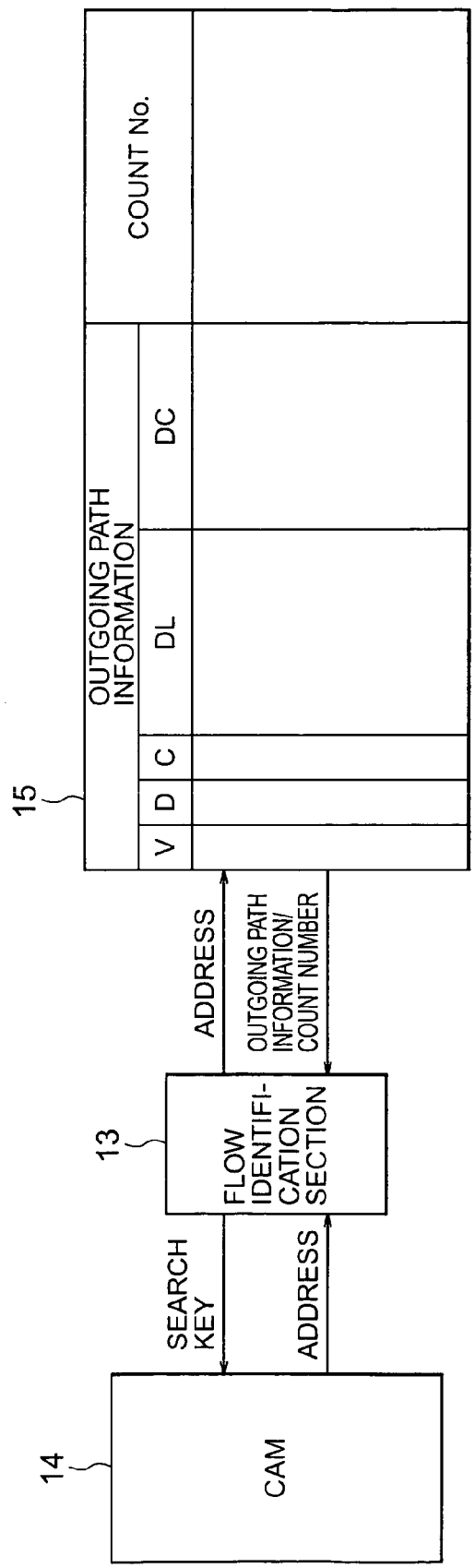
FIG. 5 is a diagram showing information obtained by a search result of the CAM of FIG. 2.

FIG. 5 is a diagram showing a search operation by the flow identification section 13 of FIG. 2. In FIG. 5, when the flow identification section 13 sends a search key including the ToS, identification protocol, source address, destination address, source port, and destination port to the CAM 14, the CAM 14 returns the address corresponding to the search key to the flow identification section 13.

The flow identification section 13 accesses the memory (#0) 15 with the address obtained from the CAM 14, and reads out outgoing path information and an identifier count number (No.). The outgoing path information includes an identifier V indicating that the search result is valid, identifier D indicating that the IP packet needs to be discarded, identifier C indicating that the IP packet needs to be transferred to the CPU 22, identifier DC indicating a port number of an outside line card and identifier DL indicating a line number of the outside line card. On the other hand, the identifier count number serves to count the number of packets or bytes of each flow by the counter section 16.

Figure 6:
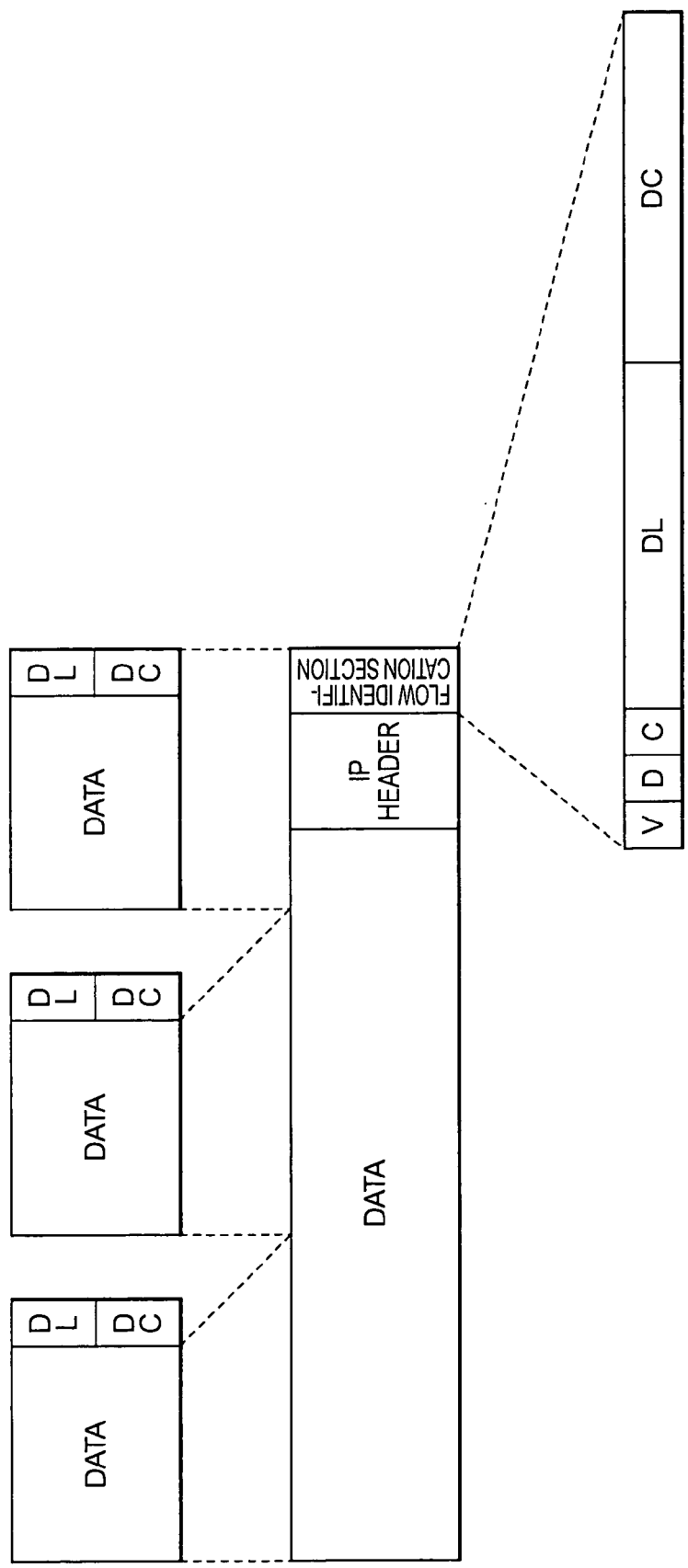
FIG. 6 is a diagram showing a constitution of an IP packet outputted from a header extraction section of FIG. 2.

FIG. 6 is a diagram showing a constitution of the IP packet outputted from the header extraction section 12 of FIG. 2. In FIG. 6, the IP packet is constituted of Data, IP header, and outgoing path information including the identifiers V, D, C, DL, DC.

Figure 7:
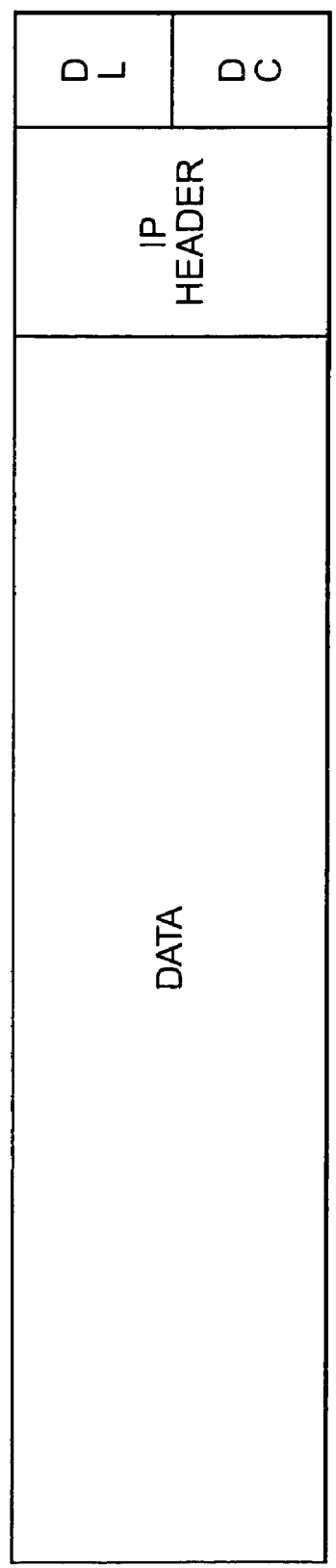
FIG. 7 is a diagram showing a constitution of the IP packet inputted into the header extraction section of FIG. 2.

FIG. 7 is a diagram showing a constitution of the IP packet inputted into the header extraction section 12 of FIG. 2. In FIG. 7, the IP packet is constituted of Data, IP header, and identifiers DL, DC.

Figure 8:
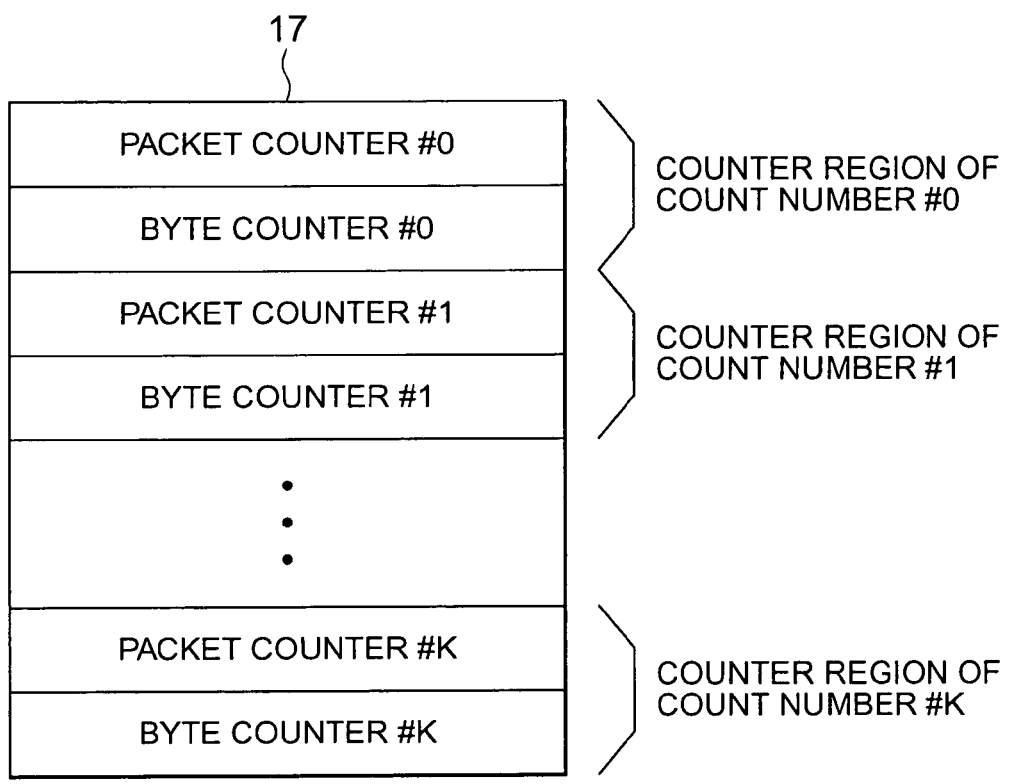
FIG. 8 is a diagram showing a constitution example of memory #1 of FIG. 2.

FIG. 8 is a diagram showing a constitution example of the memory (#1) 17 of FIG. 2. In FIG. 8, the memory (#1) 17 includes counter regions corresponding to count numbers #0 to #K, and each counter region is constituted of packet counters #0 to #K for counting the number of packets, and byte counters #1 to #K for counting the number of bytes.

FIG. 9 is an explanatory view of the flow and flow group according to one embodiment of the present invention. In FIG. 9, flows #1, #K, #N are flows of data in the network specified by ToS "a", "h", "a", Identification "b", "i", "p", Protocol "c", "j", "q", source addresses "d", "k", "r", destination addresses "e", "l", "s", source ports "f", "m", "t", and destination ports "g", "n", "u".

In the present embodiment, the count number is imparted to each of these flows #1, #K, #N, and the memory (#1) 17 can be used to count the number of packets or bytes. However, FIG. 9 shows an example in which the flows #1 and #N indicating the same service type, that is Tos of "a" are regarded as one flow group and the same count number "#0" is imparted to the group. Therefore, a different count number "#1" is imparted to the flow #K indicating the different Tos of "h". Additionally, the above-described example is only one example, and Identification, Protocol, source address, destination address, source port, and destination port may set the flow group.

Figure 10:
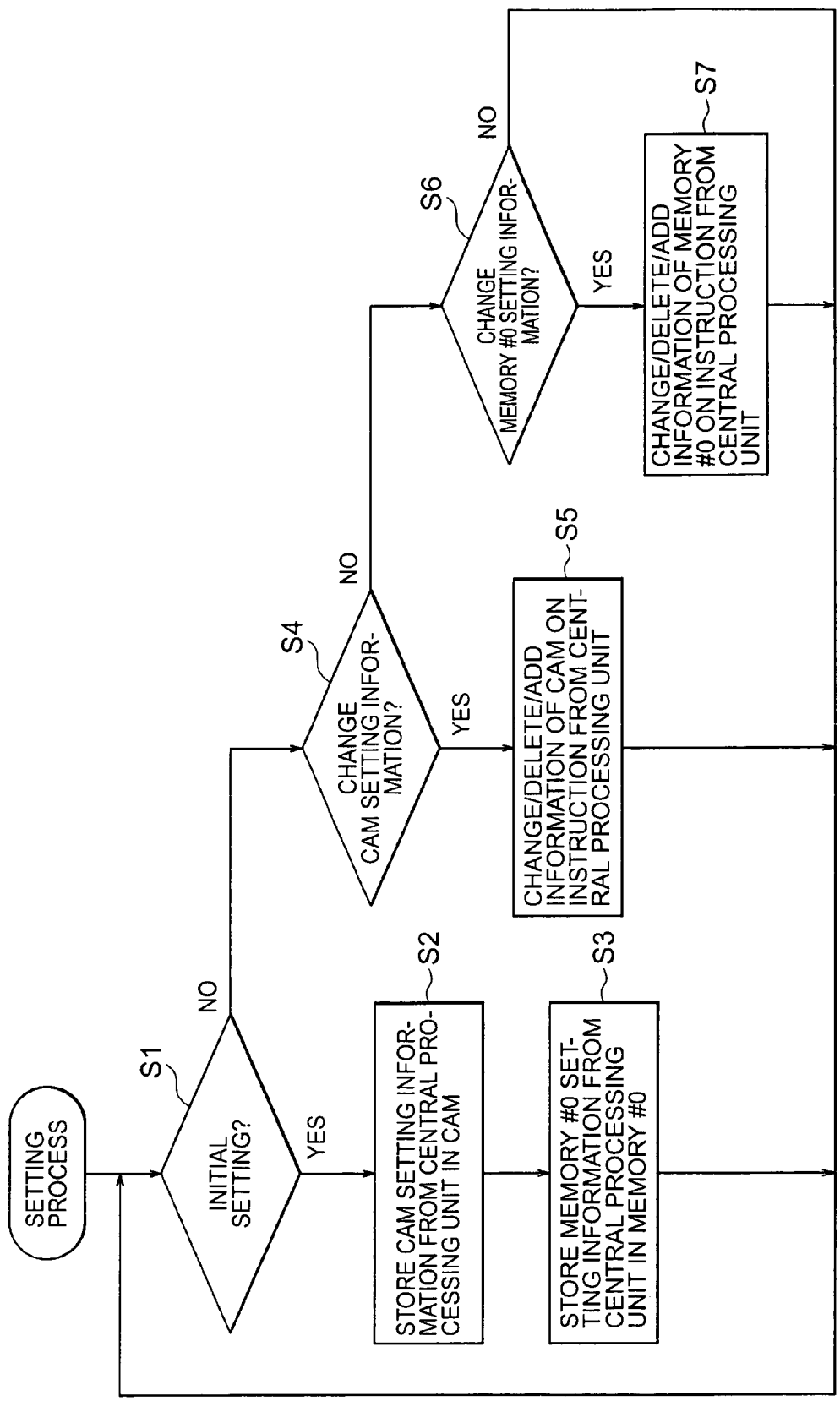
FIG. 10 is a flowchart of a setting processing in the line card of FIG. 2.
Figure 11:
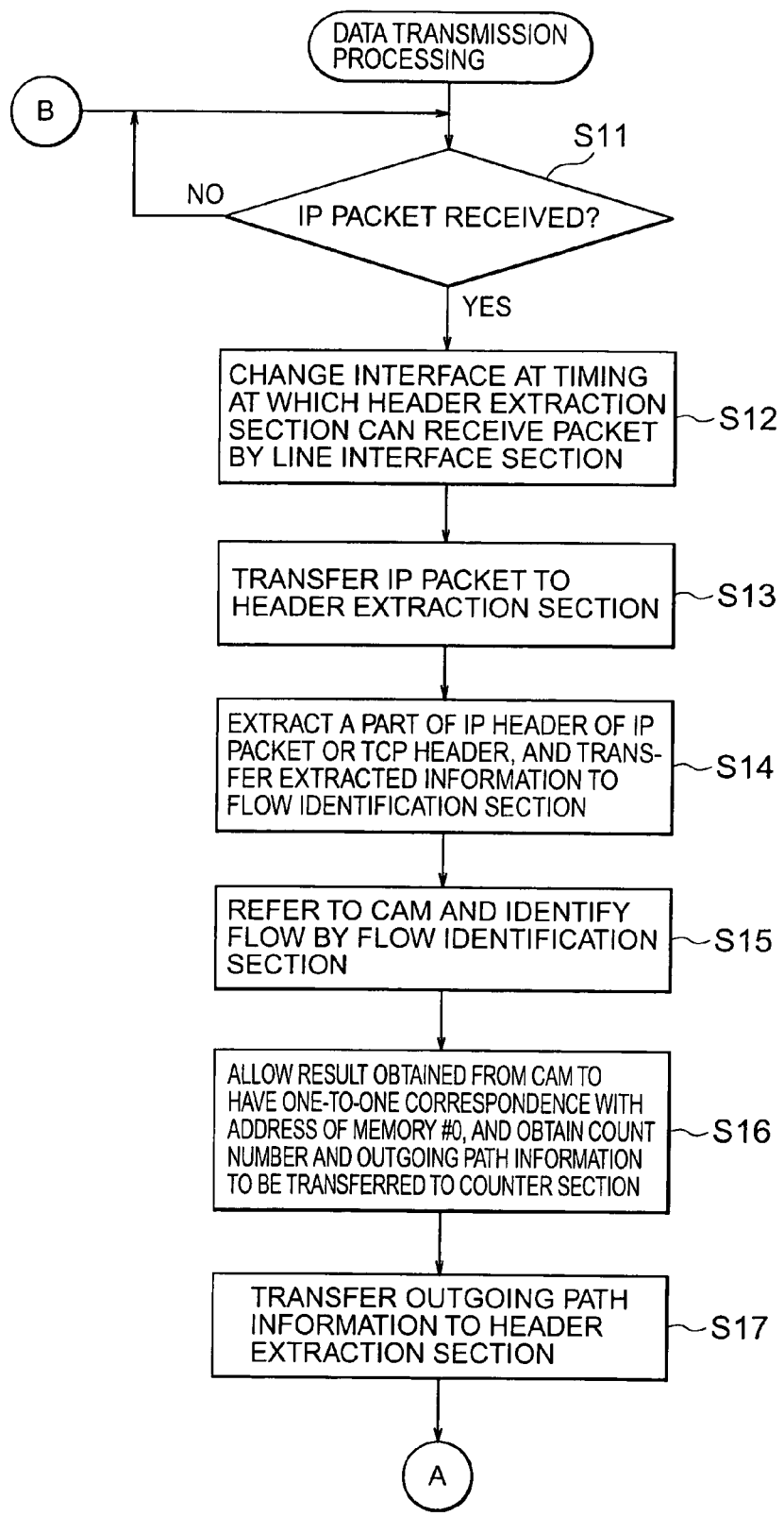
FIG. 11 is a flowchart showing a data transmission processing of the line card of FIG. 2.
Figure 12:
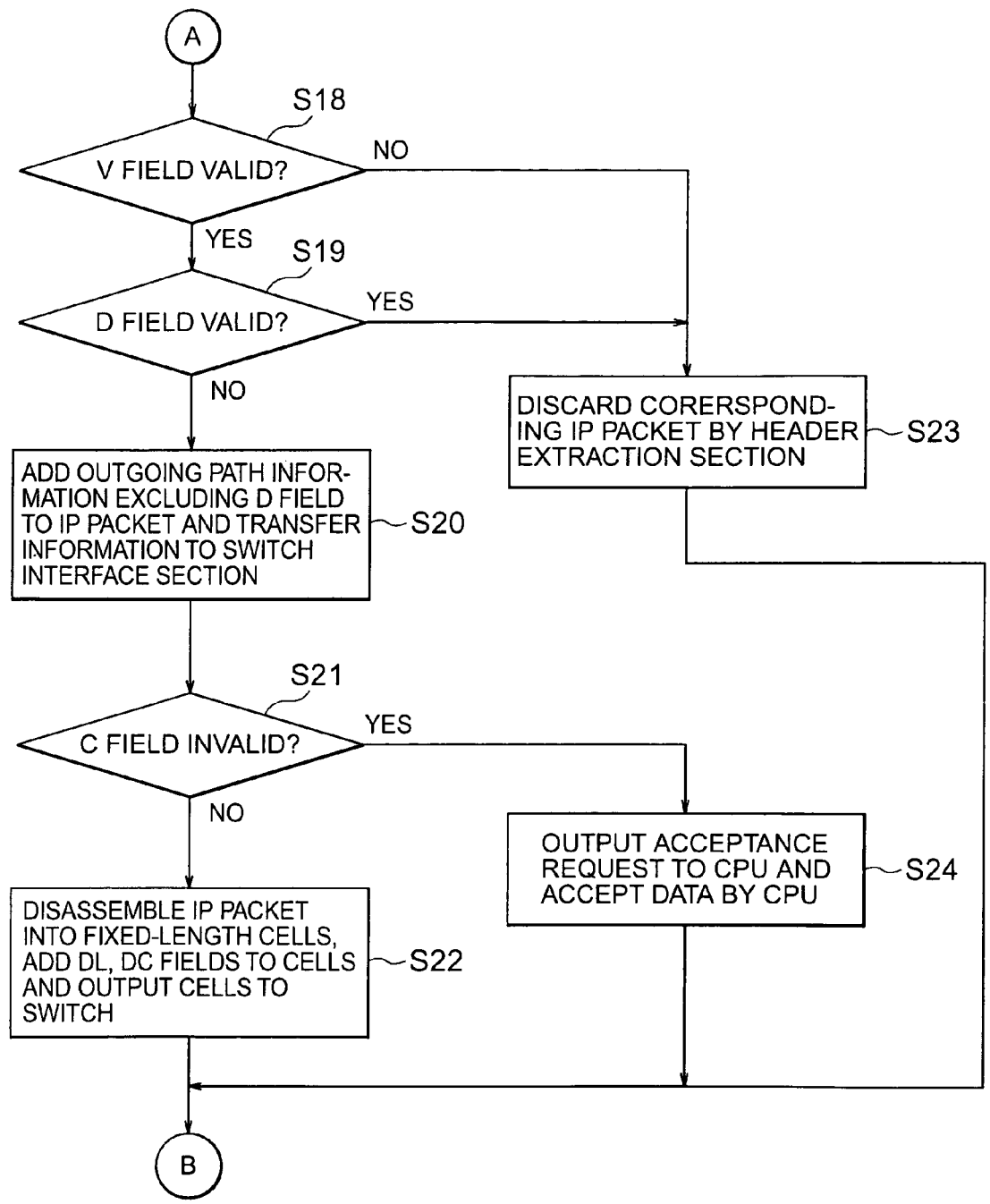
FIG. 12 is a flowchart showing the data transmission processing of the line card of FIG. 2.
Figure 13:
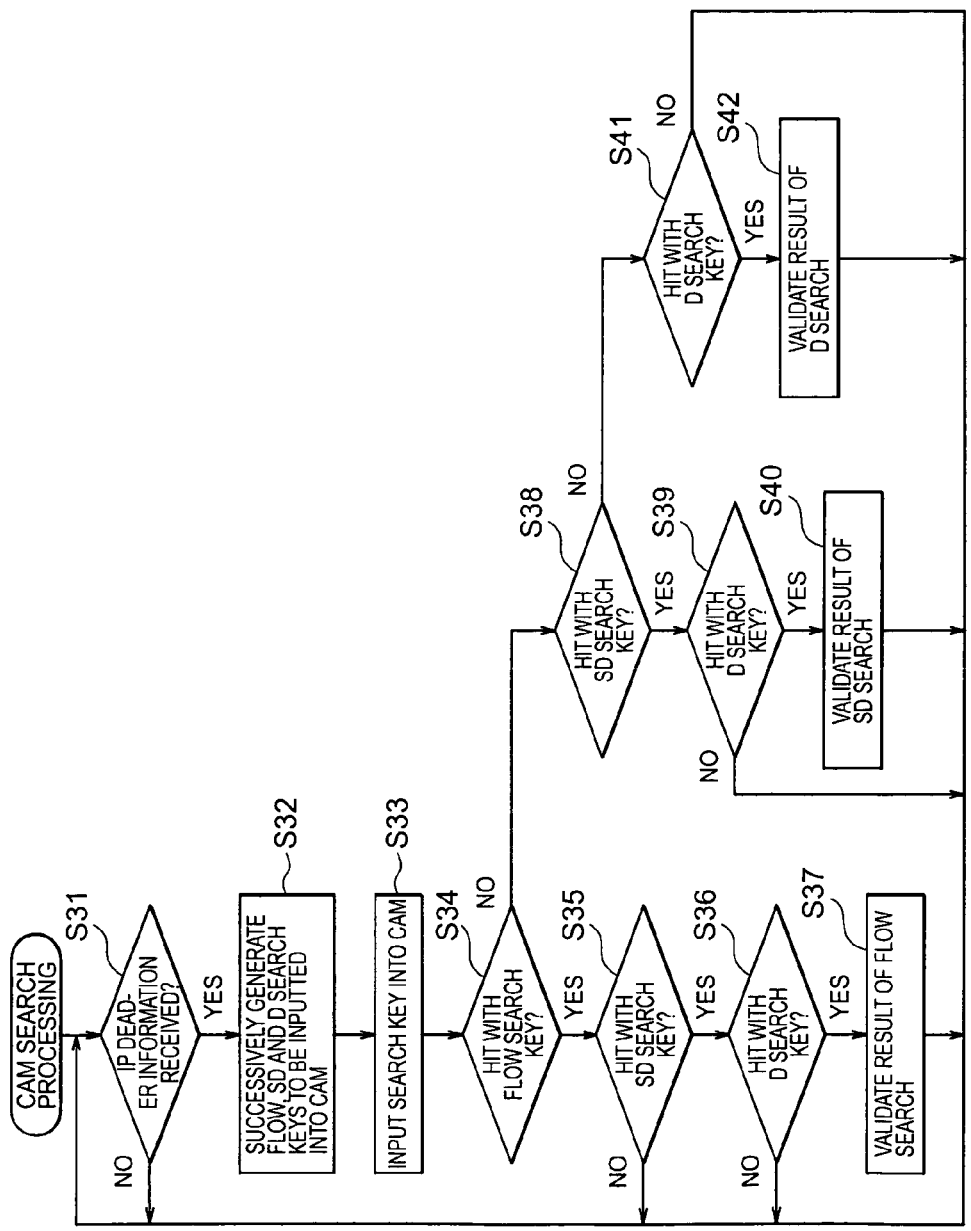
FIG. 13 is a flowchart showing a search processing of the CAM of the line card of FIG. 2.

FIG. 10 is a flowchart of a setting processing in the line card 1 of FIG. 2, FIGS. 11 and 12 are flowcharts showing a data transmission processing of the line card 1 of FIG. 2, and FIG. 13 is a flowchart showing a search processing of the CAM 14 of the line card 1 of FIG. 2.

Figure 14:
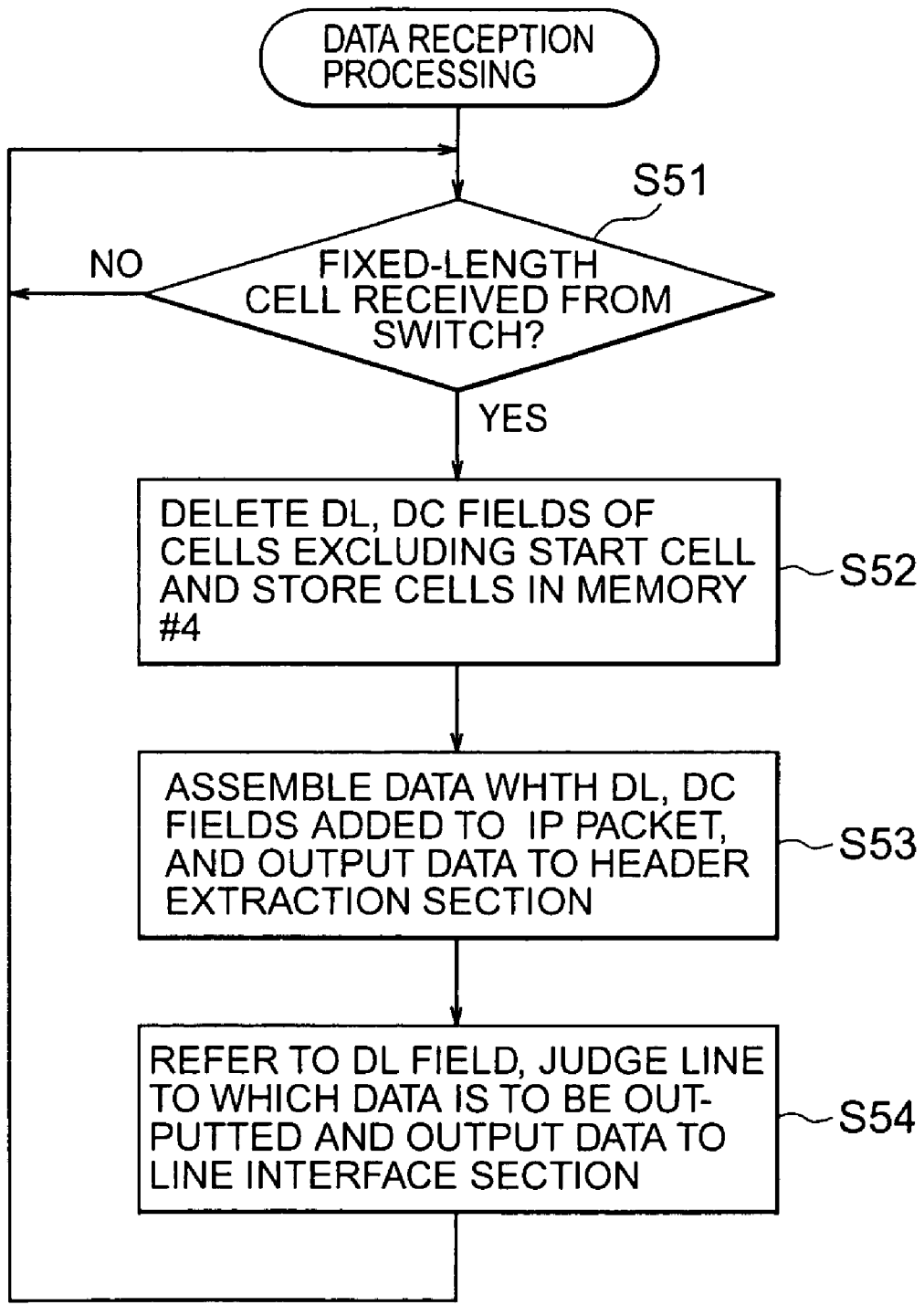
FIG. 14 is a flowchart showing a reception processing of the line card of FIG. 2.
Figure 15:
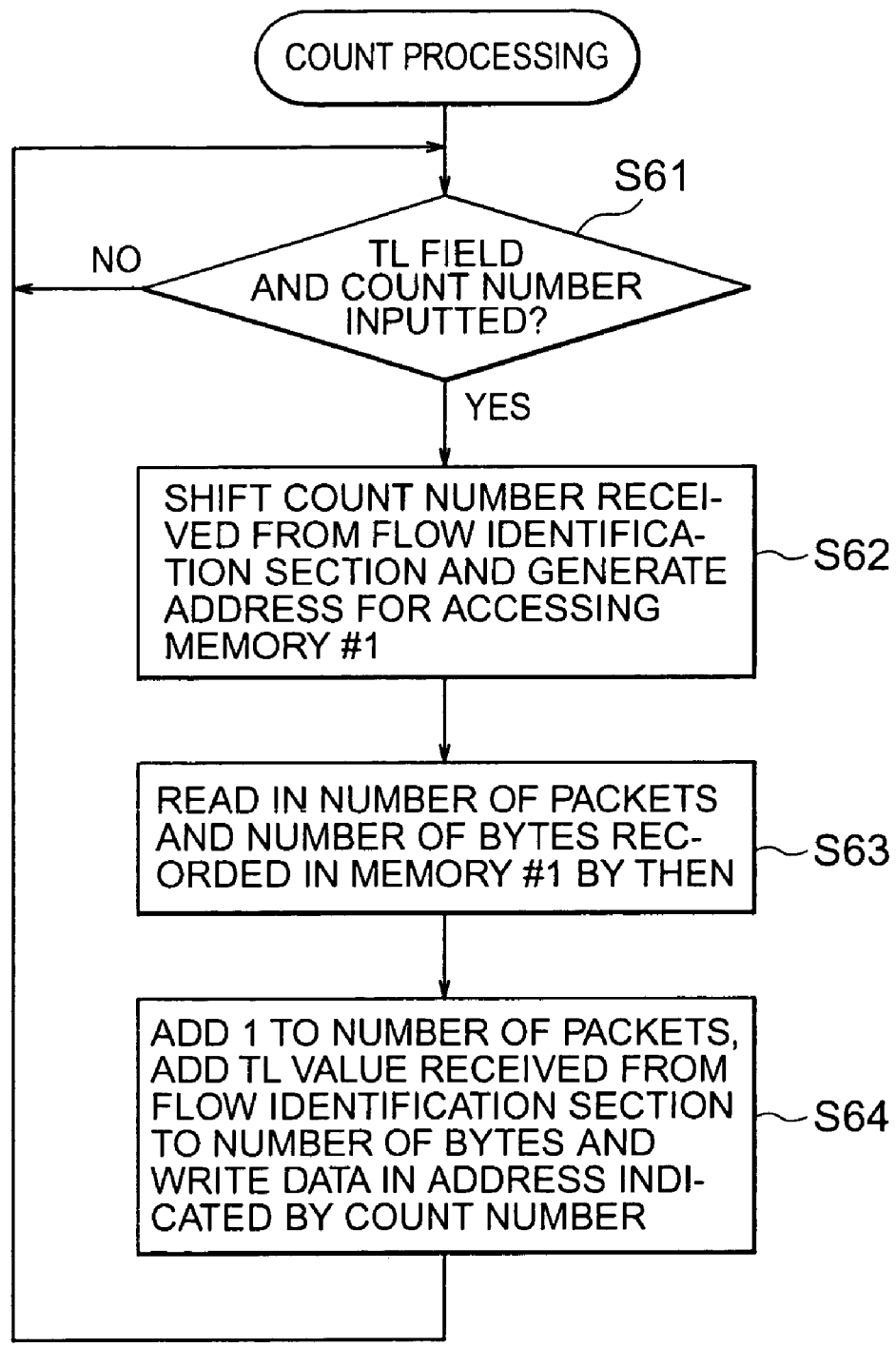
FIG. 15 is a flowchart showing a count processing of the line card of FIG. 2.
Figure 16:
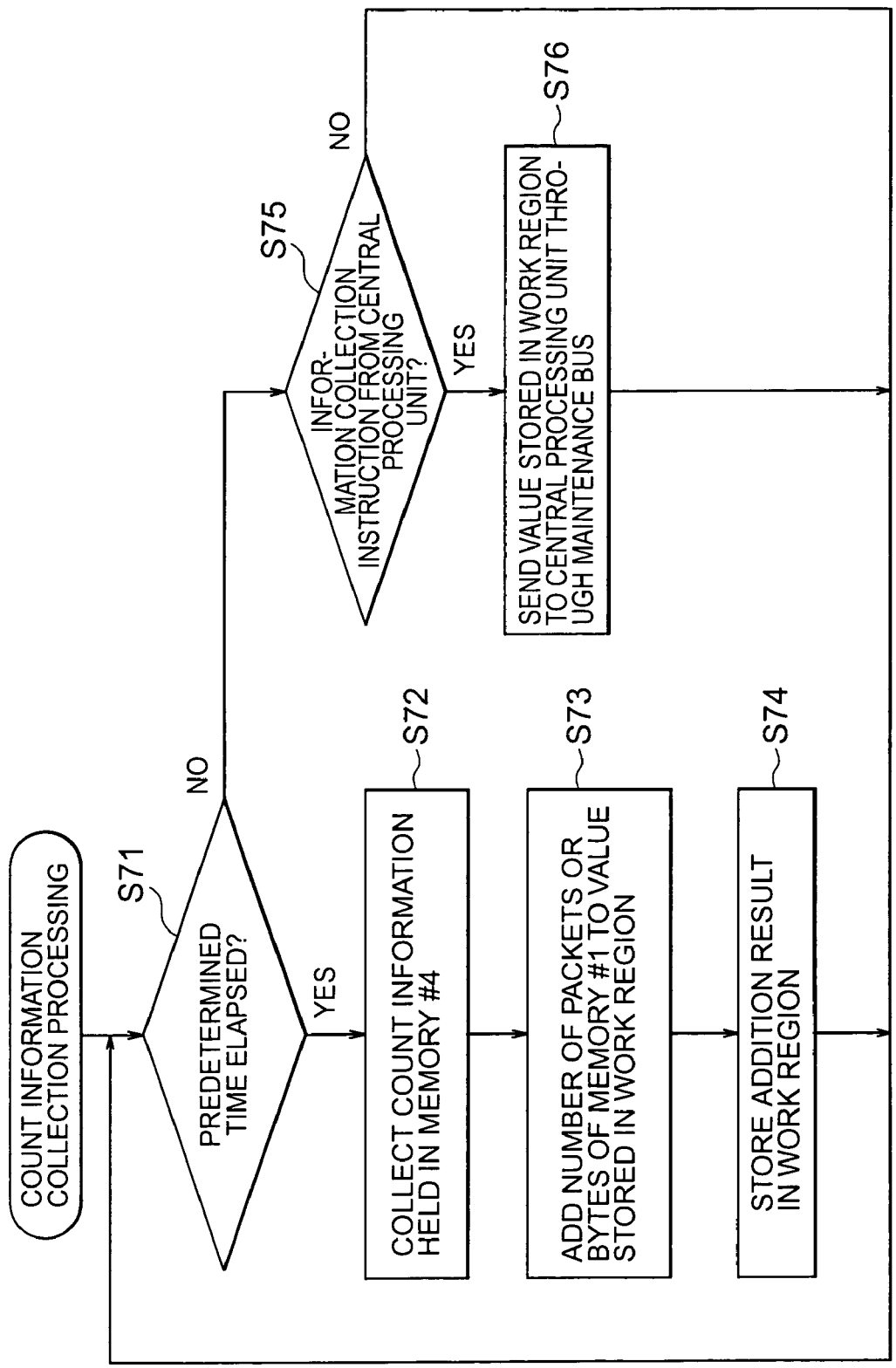
FIG. 16 is a flowchart showing a count information collection processing from the line card of FIG. 2.

Moreover, FIG. 14 is a flowchart showing a reception processing of the line card 1 of FIG. 2, FIG. 15 is a flowchart showing a count processing of the line card 1 of FIG. 2, and FIG. 16 is a flowchart showing a count information collection processing from the line card 1 of FIG. 2. A processing operation of the network monitor system according to one embodiment of the present invention will be described with reference to FIGS. 1 to 16. Additionally, the processing shown in FIGS. 10 to 16 is realized when each section of the line card 1 executes the program of the recording medium 23.

First, the setting processing in the line card 1 will be described. When the central processing unit 3 inputs setting information into the CAM 14 and memory (#0) 15 via the maintenance bus 100, and the setting information indicates initial setting operation (step S1 (Yes) of FIG. 10), the CPU 22 of the line card 1 stores CAM setting information from the central processing unit 3 into the CAM 14 (step S2 of FIG. 10). Moreover, memory #0 setting information sent from the central processing unit 3 is stored in the memory (#0) 15 (step S3 of FIG. 10).

Moreover, when the setting information of the CAM 14 is judged to be changed (step S4; Yes of FIG. 10), the CPU 22 changes/deletes/adds the information of the CAM 14 in response to an indication sent from the central processing unit 3 (step S5 of FIG. 10).

Furthermore, when the CAM setting information is not changed (step S4; No) and the setting information of the memory (#0) 15 is to be changed (step S6 of FIG. 10), the CPU 22 changes/deletes/adds the information of the memory (#0) 15 on the instruction from the central processing unit 3 (step S7 of FIG. 10).

A data transmission processing of the line card 1 will next be described. The line interface section 11 is connected to the header extraction section 12. Upon receiving the IP packet (step S11 of FIG. 11), the line interface section changes interface at a timing at which the subsequent-stage header extraction section 12 can receive the packet (step S12 of FIG. 11), and transmits the IP packet to the header extraction section 12 (step S13 of FIG. 11).

The header extraction section 12 receives the IP packet, detects the SOP from the header of the IP packet, then judges that the start of the packet has been received, extracts a part of the IP header of the IP packet received from the line interface section 11 and the TCP header, and transfers the extracted information to the flow identification section 13 (step S14 of FIG. 11). Moreover, upon detecting the EOP, the header extraction section 12 judges that the end of the IP packet has been received, and judges the data received from when SOP is enabled until EOP is enabled as one IP packet.

The flow identification section 13 is connected to the CAM 14 and memory (#0) 15. As shown in FIG. 5, when the search key generated from the header information is inputted into the CAM 14, the flow identification section identifies the flow (step S15 of FIG. 11). The flow identification section allows the result obtained from the CAM 14 to have one-to-one correspondence with the address of the memory (#0) 15, accesses the memory (#0) 15 and obtains the count number and outgoing path information to be transferred to the counter section 16 (step S16 of FIG. 11).

Concretely, upon receiving the IP header information from the header extraction section 12 (step S31 of FIG. 13), the flow identification section 13 extracts ToS, Identification, Protocol, source address, destination address, source port, and destination port from the IP header information and generates the search key (hereinafter referred to as a flow search key) to be inputted into the CAM 14.

Additionally, the flow identification section 13 has a function of extracting the source and destination addresses and generating the search key (hereinafter referred to as SD search key), and a function of extracting only the destination address and generating the search key (hereinafter referred to as D search key). Moreover, the flow identification section 13 can also be set to have a function of successively generating these three search keys, and inputting the search key into the CAM 14 (steps S32, S33 of FIG. 13).

In this case, as a result of three patterns of searches, the flow identification section 13 regards the search results having multiple bits as valid with a plurality of hits (when the search key matches with the entry registered in the CAM 14, and the CAM 14 returns a response).

For example, with the bits of all the three search keys, the flow identification section 13 validates the search result of the flow search key (steps S34 to S37 of FIG. 13). Moreover, with the hits of the SD and D search keys, the flow identification section 13 validates the search result of the SD search key (steps S38 to S40 of FIG. 13). Furthermore, with the hit only of the D search key, the flow identification section 13 validates the search result of the D search key (steps S41, S42 of FIG. 13).

The outgoing path information obtained by the flow identification section 13 is transferred to the header extraction section 12 (step S17 of FIG. 11). In this case, when V and D fields are valid (steps S18, S19 of FIG. 12), the header extraction section 12 discards the corresponding IP packet (step S23 of FIG. 12). Moreover, even when the V field is invalid (step S18 of FIG. 12), the header extraction section 12 discards the corresponding IP packet (step S23 of FIG. 12).

On the other conditions, the header extraction section 12 adds the outgoing path information excluding the D field to the IP packet and transmits the packet to the switch interface section 18 (step S20 of FIG. 12). The interface of the header extraction section 12 with the switch interface section 18 is similar to the interface shown in FIG. 3. The switch interface section 18 starts receiving the data, when the SOP is enabled. The switch interface section stores the received data in the memory (#3) 20, until the EOP is enabled.

When the EOP is enabled, and the end of the IP packet is judged to have been received, the switch interface section 18 checks the V, C fields. When the V field is valid and the C field is invalid (it is unnecessary to transfer the data to the CPU 22) (step S21 of FIG. 12), as shown in FIG. 6, the switch interface section disassembles the IP packet into fixed-length cells, adds DL, DC fields to each cell and outputs the cells to the switch 2 (step S22 of FIG. 12).

Moreover, when the V and C fields are valid (it is necessary to transfer the received data to the CPU 22) (step S21 of FIG. 12), the switch interface section 18 outputs a request for acceptance to the CPU 22, and the CPU 22 accepts the data (step S24 of FIG. 12).

When the fixed-length cells are received from the switch 2 (step S51 of FIG. 14), the DL and DC fields of the respective cells excluding the start cell are deleted and the cells are stored in the memory (#4) 21 (step S52 of FIG. 14). As shown in FIG. 7, the data in which the DL and DC fields are added to the IP packet is assembled, and outputted to the header extraction section 12 (step S53 of FIG. 14).

The header extraction section 12 refers to the DL field, judges a line to which the data is to be outputted and outputs the data to the line interface section 11 (step S54 of FIG. 14).

A method of using the count number will next be described. The flow identification section 13 transmits a TL field included in header information received from the header extraction section 12, and the count number obtained from the search result to the counter section 16.

The counter section 16 is connected to the memory (#1) 17, and records the number of packets or bytes in the memory (#1) 17. The count number serves as a pointer of the memory (#1) 17.

The counter section 16 shifts the count number received from the flow identification section 13 and generates the address for accessing the memory (#1) 17 (steps S61, S62 of FIG. 15), and reads in the number of packets or bytes recorded in the memory (#1) 17 by then (step S63 of FIG. 15). The counter section adds 1 to the number of packets, adds a TL value received from the header extraction section 12 to the number of bytes, writes the value after the addition into the address indicated by the count number, and controls the respective count values (step S64 of FIG. 15).

The count number can also be assigned uniquely to each entry of the CAM 14, or the same count number can also be assigned to entries A and B. When the same count number is assigned to the entries A and B, the counter section 16 can count the total of two flows. That is, when the same count number is assigned to N arbitrary entries, the total number of packets or bytes can be controlled with respect to N flows by the counter section 16.

On the other hand, when the central processing unit 3 collects count information from the line card 1, with an elapse of a predetermined time (step S71 of FIG. 16), the line card 1 collects the count information held in the memory (#1) 17 (step S72 of FIG. 16), adds the number of packets or bytes of the memory (#1) 17 to the value stored in the work region of the recording medium 23 (step S73 of FIG. 16), and stores an addition result into the work region of the recording medium 23 (step S74 of FIG. 16).

When an information collection instruction is inputted from the central processing unit 3 (step S75 of FIG. 16), the line card 1 sends the value stored in the work region of the recording medium 23 to the central processing unit 3 through the maintenance bus 100 (step S76 of FIG. 16). The central processing unit 3 generates accounting information of each flow or each flow group based on the number of packets or bytes sent from the line card 1.

Since the count number can be imparted to each entry of the CAM 14 in this manner, the number of packets or bytes can be controlled for each flow, and the total number of packets or bytes can be counted in consideration of the group. Therefore, since it is possible to generate the accounting information based on the total number of packets or bytes, it is possible to generate the accounting information in consideration of each flow or group. For example, when a plurality of services are used in the flow from the transmission source, the accounting information can be generated every plurality of services. This also means that the accounting information can be generated with respect to the group of the plurality of flows and for each service.

Moreover, when the count number is imparted to each group, the total number of packets or bytes of the group can be counted. Therefore, the memory region can be saved, when the sum of a plurality of flows is counted.

Furthermore, when the count number for the entry of the CAM 14 is changed, the group can be changed, and therefore the group to count can easily be changed.

Additionally, since the count number can be derived by the flow, SD and D search keys, the flows can be grouped in consideration of fine conditions. Therefore, it is possible to monitor the communication data amount in consideration of the group or the finer group with the conditions other than the IP address added thereto, and the accounting information can be generated.

Moreover, in the above description, the protocol of Internet protocol version 4 (IPv4) has been described, but the present invention can also be applied to the protocol of Internet protocol version 6 (IPv6), and is not limited thereto. Furthermore, for the flow group, as described above, any item of Tos, Identification, Protocol, source address, destination address, source port, and destination port can be set as a control unit, or a plurality of items can also be set as the control unit.

As described above, according to the present invention, in the network monitor system including a plurality of line cards to determine the outgoing path from the header of the packet, and the switch to switch to the outside line card in accordance with the information of the outgoing path, each of the plurality of line cards uses the identifier that is imparted beforehand to each predetermined control unit or management unit and that includes any one of the flow identified from the information of the header and indicating the flow of data, and the flow group set beforehand based on the information of the header, and controls the communication amounts of the packets. This structure is advantageous in that the communication data amount can be monitored in each line card in consideration of the group or the finer or subdivided group with the conditions other than the IP address added thereto.

What is claimed is:

1. A network monitor system comprising:
   a plurality of line cards each of which is operative to determine an outgoing path with reference to information from a header of a packet of a plurality of packets; and
   a switch which is operative to switch the packet from one of the outside line cards to another in accordance with information of said outgoing path, each of said plurality of line cards comprising:
   a counter unit which groups flows into a flow group with reference to a count number and which counts the packets having a predetermined field or fields in a group,
   wherein each how is specified by a plurality of fields and the count number is imparted to each flow group to group each how with reference to the predetermined field or fields and has the count number the same when each flow belongs to the same group.

2. The network monitor system according to claim 1 wherein the counter units count at least one of the number of said packets and the number of bytes as the communication amount of a flow group.

3. The network monitor system according to claim 2, wherein each of said plurality of line cards further comprises holding means for holding the communication amount of said packets counted by at least one of said counter units.

4. The network monitor system according to claim 1, wherein each of said plurality of line cards further comprises:
   a header extraction unit which extracts information from a header of a packet of said plurality of packets; and
   a flow identification unit that receives the information extracted by the header extraction unit to determine said outgoing path, an identifier and maid communication amount wherein the identifier is previously assigned to a management unit and includes a flow which is identified from the information extracted by the header extraction unit to indicate the flow group.

5. The network monitor system according to claim 4 wherein an identifier is changed, when a flow group is changed.

6. The network monitor system according to claim 4, wherein each of said plurality of line cards further comprises:
   a content-addressable memory (CAM) in which information for use in identifying one flow group of the flow groups is accumulated.

7. The network monitor system according to claim 4, wherein at least one identifier is derived by at least one from a search of all the information of at least one header, a search by a source address and destination address of said at least one header, and a search only by said destination address of said at least one header.

8. The network monitor system according to claim 4, further comprising:
   a central processing unit which monitors said plurality of line cards.

9. The network monitor system according to claim 8 wherein said central processing unit collects the communication amount counted by the counter unit of each of said plurality of line cards and generates accounting information based on communication amounts collected.

10. The network monitoring system according to claim 4, wherein said identifier is identified from heading information including at least one of type of service "ToS", a source port and a destination portion.

11. A method of counting a data amount in a network monitor system, the network monitor system comprising a plurality of line cards each which determine an outgoing path from a header of a packet of a plurality of packets; and a switch which is operative to switch the packet from one of the outside line cards to another in accordance with information of said outgoing path, the method being executed in each of the plurality of the line cards and comprising:
   monitoring an identifier associated with a flow group of a plurality of packets which is identified from the information of a header of each packet;
   counting a communication amount of said packets in the flow group identified by the use of the identifier;
   extracting information from the header of each packet;
   determining an outgoing path, an identifier, and a communication amount based on the extracted information.

12. The method according to claim 11 wherein the counting the communication amount of said packets further comprises:
   counting the communication amount in response to at least one of the number of said packets and the number of bytes as the communication amount of a flow group.

13. The method according to claim 11, further comprising:
   preparing hold means, which has an address, for holding the communication amount of packets counted in each of the line cards.

14. The method according to claim 11, further comprising:
   changing an identifier, when a flow group is changed.

15. The method according to claim 11, further comprising:
   deriving an identifier by at least one of a search based on all the information of a header, a search by a source address and destination address of said header, and a search only by a destination address.

16. The method according to claim 11, further comprising:
monitoring said plurality of line cards from a central processing unit.

17. The method according to claim 16, further comprising:
collecting the communication amount counted by each of said plurality of line cards and generating accounting information based on the communication amounts collected.

18. A method of counting a data amount in a network monitor system, the network monitor system comprising a plurality of line cards each which determine an outgoing path from a header of a packet of a plurality of packets; and a switch which is operative to switch the packet from one of the outside line cards to another in accordance with information of said outgoing path, the method being executed in each of the plurality of the line cards and comprising:
monitoring an identifier associated with a flow group of a plurality of packets which is identified from the information of a header of each packet;
counting a communication amount of packets in the flow group identified by the use of the identifier; and
identifying a flow group based on information extracted from the header of a packet using a content-addressable memory (CAM) in which information for use in identifying a flow group is accumulated.

19. A computer readable medium encoded with a computer program for use in executing a method of counting a data amount in a network monitor system by the use of a computer, the network monitor system comprising a plurality of line cards each of which determines an outgoing path from a header of a packet of a plurality of packets; and a switch which switches the packet from one of the outside line cards to another in accordance with information of said outgoing path, said computer program comprising:
executing a process of using an identifier to monitor a flow group from a plurality of packets which is identified from the information of said header of each packet of said plurality of packets;
counting a communication amount of said flow group using said identifier;
extracting information from said header of each packet; and
determining an outgoing path, an identifier and a communication amount based on the extracted information.

20. A line card for use in determining an out going path with reference to a header of each packet of a plurality of packets in a network monitor system, comprising:
monitoring means for monitoring a predetermined identifier of the header in each packet associated with a flow group; and
means for counting a communication amount of the packets corresponding to said flow group;
means for extracting information from said headers of said packets;
means for determining said outgoing path, said identifier, and said communication amount based on the information of said header.

21. A method of counting a communication data amount in a network monitor system having a plurality of line cards each which is operative to determine an outgoing path from a header of a packet of a plurality of packets, the method comprising:
monitoring, in a line card, the header of each packet to detect a data flow using an identifier by monitoring the information of the header; and
counting, in the line card, a communication data amount of said data flow corresponding to said data flow by the use of the identifier;
extracting information from said header of each packet; and
determining said outgoing path, said identifier, and said communication amount based on the extracted information.

* * * * *

UNITED STATES PATENT AND TRADEMARK OFFICE
CERTIFICATE OF CORRECTION

PATENT NO. : 7,701,942 B2
APPLICATION NO. : 10/170354
DATED : April 20, 2010
INVENTOR(S) : Keisuke Fukumoto and Bun Mizuhara It is certified that error appears in the above-identified patent and that said Letters Patent is hereby corrected as shown below:

Column 7, Line 28, delete "with the bits" and insert --with the hits--.

Column 9, Line 51, (claim 1) delete "how" and insert --flow--.

Column 9, Line 53, (claim 1) delete "how" and insert --flow--.

Column 10, Line 3, (claim 4) delete "maid communication" and insert --a communication--.

Signed and Sealed this

Seventh Day of September, 2010

David J. Kappos
*Director of the United States Patent and Trademark Office*